(12) United States Patent
Clark (10) Patent No.: US 10,459,075 B2
(45) Date of Patent: Oct. 29, 2019

(54) RADAR

(71) Applicant: BAE SYSTEMS plc, London (GB)

(72) Inventor: Marcus Edward Clark, Isle of Wight (GB)

(73) Assignee: BAE SYSTEMS plc, London (GB)

( * ) Notice: Subject to any disclaimer, the term of this patent is extended or adjusted under 35 U.S.C. 154(b) by 583 days.

(21) Appl. No.: 14/903,835

(22) PCT Filed: Jul. 2, 2014

(86) PCT No.: PCT/GB2014/052003
§ 371 (c)(1),
(2) Date: Jan. 8, 2016

(87) PCT Pub. No.: WO2015/004426
PCT Pub. Date: Jan. 15, 2015

(65) Prior Publication Data
US 2016/0161604 A1    Jun. 9, 2016

(30) Foreign Application Priority Data

Jul. 10, 2013  (EP) ...................................... 13275160
Jul. 10, 2013  (GB) .................................. 1312353.4

(51) Int. Cl.
*G01S 13/44* (2006.01)
*G01S 7/28* (2006.01)
(Continued)

(52) U.S. Cl.
CPC ........ *G01S 13/4418* (2013.01); *G01S 7/2813* (2013.01); *G01S 13/424* (2013.01); *H01Q 3/2617* (2013.01)

(58) Field of Classification Search
CPC .. G01S 13/424; G01S 13/4418; G01S 7/2813; G01S 13/44; G01S 13/4445;
(Continued)

(56) References Cited

U.S. PATENT DOCUMENTS 4,005,421 A * 1/1977 Dax ..................... G01S 13/4418
                                                  342/148
6,476,760 B1 * 11/2002 Winter .................. G01S 7/4026
                                                  342/104

(Continued)

FOREIGN PATENT DOCUMENTS

DE         3637655 A1    5/1988
GB         1546084 A     5/1979
(Continued)

OTHER PUBLICATIONS

International Search Report and Written Opinion received for Patent Application No. PCT/GB2014/052003, dated Apr. 11, 2014. 12 pages.

(Continued)

*Primary Examiner* — Bernarr E Gregory
*Assistant Examiner* — Daniel P Malley, Sr.
(74) *Attorney, Agent, or Firm* — Finch & Maloney PLLC (57) ABSTRACT

A radar apparatus (5) for detecting multipath signal propagation when determining an elevation angle of an object, comprising an antenna array with which the radar apparatus is arranged to form at least three separate antenna beams (11, 12, 13) comprising a first antenna beam (11) having an angle of elevation above horizontal, and a separate second antenna beam (12) having an angle of elevation at or above horizontal which is less than that of the first antenna beam, and a separate third antenna beam (13) having an angle of elevation below horizontal. The apparatus is arranged to transmit radio pulses from the antenna array; to receive return radio signals within the first, second and third antenna beams; to calculate a measure of the magnitude of a return radio signal received within the third antenna beam using all of said received radio signals collectively; and, to detect multipath signal propagation using said measure.

20 Claims, 4 Drawing Sheets

(51) Int. Cl.
*G01S 13/42* (2006.01)
*H01Q 3/26* (2006.01)

(58) Field of Classification Search
CPC .. G01S 13/4436; G01S 13/4481; G01S 7/285; G01S 7/292; G01S 7/29222; G01S 7/52077; H01Q 3/2617; H01Q 3/26; H01Q 3/2611; H01Q 25/02; H01Q 25/04
See application file for complete search history.

(56) References Cited

U.S. PATENT DOCUMENTS

| | | | |
|---|---|---|---|
| 2007/0273576 A1* | 11/2007 | Struckman | G01S 3/146 342/156 |
| 2010/0149021 A1* | 6/2010 | Driessen | G01S 13/4418 342/118 |
| 2011/0260920 A1* | 10/2011 | Dybdal | G01S 7/2813 342/379 |
| 2013/0027241 A1* | 1/2013 | Sego | G01S 13/4445 342/149 |
| 2016/0161597 A1* | 6/2016 | Treptow | G01S 7/4026 342/174 |

FOREIGN PATENT DOCUMENTS

| | | |
|---|---|---|
| GB | 2094586 A | 9/1982 |
| GB | 2493250 A | 1/2013 |
| JP | 2001264427 A | 9/2001 |
| JP | 3681986 P | 5/2005 |
| JP | 2005189107 A | 7/2005 |
| WO | 2015004426 A1 | 1/2015 |

OTHER PUBLICATIONS

GB Intellectual Property Office Search Report under Section 17(5) received for GB Patent Application No. 1312353.4 dated Dec. 18, 2013. 4 pages.

Extended European Search Report received for EP Patent Application No. 13275160.3 dated Jan. 17, 2014. 5 pages.

International Preliminary Report on Patentability received for Patent Application No. PCT/GB2014/052003, dated Jan. 21, 2016. 9 pages.

* cited by examiner

RADAR

The preset invention relates to radar systems, apparatus and methods, and particularly, though not exclusively, to the tracking of objects by radar.

Radar tracking of distant objects may employ a methodology whereby two partially overlapping radar beams/lobes of a radar antenna are directed towards a target object. Return radio signals comprising radio waves originating from a first of the beams and reflected back by the object are subsequently detected by the radar antenna. Also, return radio signals from a second of the beams reflected back by the object are detected by the radar antenna. When the object is positioned midway between the angular separation of the two beams, the two return signals have equal magnitude, otherwise, they do not. The direction of the radar beam may be adjusted to maintain the two return signals equal in magnitude and thereby track the object. In some prior art systems this adjustment may be done by adjusting the direction of the antenna itself.

Multipath is the propagation phenomenon whereby radar signals reach the receiver of the radar apparatus via a number of different propagation paths. The dominant multipath mechanisms are reflection and diffraction from the ground and other nearby structures, e.g. buildings, vegetation or vehicles. This type of multipath is one of the most significant causes of radar ranging errors. Typically, multipath manifests itself in the received signal as a number of attenuated, phase-shifted and delayed (since the indirect path is always longer) replicas of the line-of-sight signal summed together. When the multipath delay is large, a receiver can readily resolve the multipath and will not suffer significant effects on performance. Shorter delays, from grazing reflections and close-in structures, are far less easy to distinguish and render multipath errors significant.

The invention aims to address these matters.

In a first aspect, the invention provides a radar apparatus for detecting multipath signal propagation when determining an elevation angle of an object, comprising an antenna array with which the radar apparatus is arranged to form at least three separate antenna beams comprising a first antenna beam having an angle of elevation above horizontal, and a separate second antenna beam having an angle of elevation at or above horizontal which is less than that of the first antenna beam, and a separate third antenna beam having an angle of elevation below horizontal. The apparatus is arranged to transmit radio pulses from the antenna array, to receive return radio signals within the first, second and third antenna beams, to calculate a measure of the magnitude of a return radio signal received within the third antenna beam using all of the received radio signals collectively, and, to detect multipath signal propagation using the measure.

The measure is preferably the magnitude of an eigenvalue of the cross-correlation matrix of return radio signals received within the at least three separate antenna beams.

The radar apparatus may be further arranged to determine an elevation of an object using eigenvectors of the cross-correlation matrix other than an eigenvector thereof associated with the eigenvalue if the magnitude of the eigenvalue exceeds a threshold value.

The radar apparatus may be further arranged to beam-form one or more of the antenna beams to locate a null in the beam pattern of the antenna array at the angular location associated with the detected multi-path signal propagation if the magnitude of the eigenvalue exceeds a threshold value.

The angular separation in elevation between the first and second antenna beams is preferably substantially the same as the angular separation in elevation between the second and third antenna beams.

Preferably one, some or each of the first, second and third radar beams is a pencil beam.

The antenna array may comprise a first antenna unit arranged to form independently the first antenna beam, a second antenna unit arranged to form independently the second antenna beam, and a third antenna unit arranged to form independently the third antenna beam.

The antenna array may comprise a phased array of antennas which controlled collectively to form the first antenna beam, the second antenna beam, and the third antenna beam.

In a second aspect, the invention provides a mono-pulse radar apparatus comprising the radar apparatus described above.

In a third aspect, the invention provides a method for detecting multipath signal propagation when determining an elevation angle of an object using radar, comprising, with an antenna array, forming at least three separate antenna beams comprising a first antenna beam having an angle of elevation above horizontal, and a separate second antenna beam having an angle of elevation at or above horizontal which is less than that of the first antenna beam, and a separate third antenna beam having an angle of elevation below horizontal, transmitting radio pulses from the antenna array, receiving return radio signals within the first, second and third antenna beams, calculating a measure of the magnitude of a return radio signal received within the third antenna beam using all of the received radio signals collectively, and, detecting multipath signal propagation using the measure.

The measure is preferably the magnitude of an eigenvalue of the cross-correlation matrix of return radio signals received within the at least three separate antenna beams.

The method may include determining an elevation of an object using eigenvectors of the cross-correlation matrix other than an eigenvector thereof associated with the eigenvalue if the magnitude of the eigenvalue exceeds a threshold value.

The method may include beam-forming one or more of the antenna beams to locate a null in the beam pattern of the antenna array at the angular location associated with the detected multi-path signal propagation if the magnitude of the eigenvalue exceeds a threshold value.

The method may include forming the antenna beams such that the angular separation in elevation between the first and second antenna beams is substantially the same as the angular separation in elevation between the second and third antenna beams.

The method may include forming one, some or each of the first, second and third radar beams as a pencil beam.

There now follows a non-limiting example of a preferred embodiment of the invention with reference to the accompanying drawings of which.

In the drawings, like items are assigned like reference symbols.

Figure 1A:
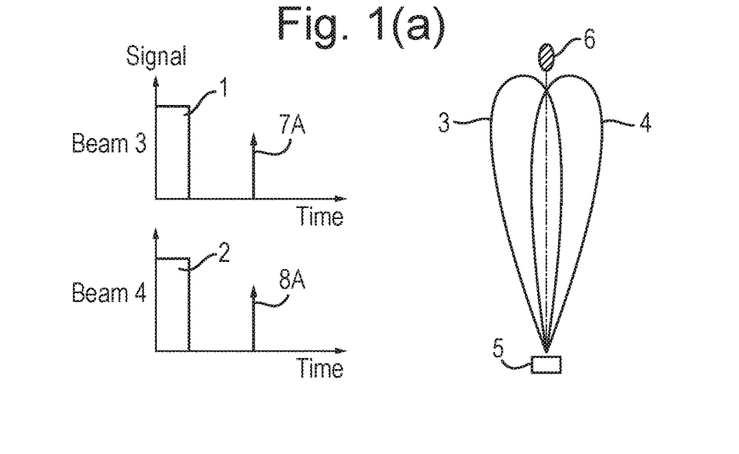
FIGS. 1(a), 1(b) and 1(c) illustrate the principles of radar tracking using mono-pulse (simultaneous lobbing), and multipath signal propagation.
Figure 1B:
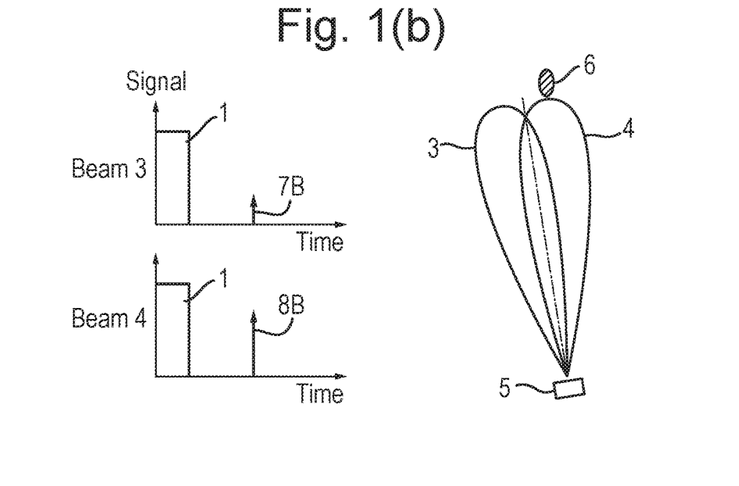
Figure 1C:
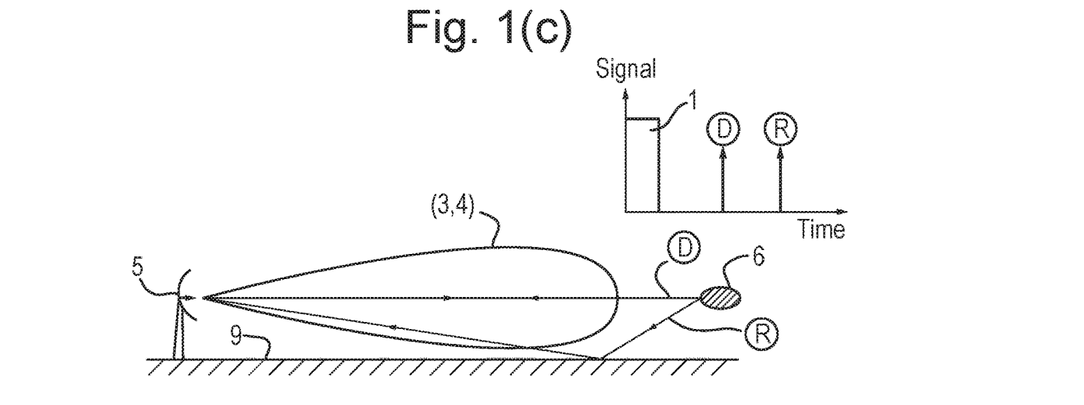

Referring to FIGS. 1(a) to (c), mono-pulse radar tracking operates by simultaneously transmitting from a radar antenna (5) two radar pulses (1, 2) within a pair of partially overlapping radar beams (3, 4) directed towards a distant object (6) being tracked. Return radio signals (7A) comprising radio waves originating from a first of the partially overlapping beams (3) and reflected directly back by the object are subsequently detected by the radar antenna. Simultaneously, return radio signals (8A) comprising radio waves originating from a second of the partially overlapping beams (4) and reflected directly back by the object are also subsequently detected by the radar antenna. When the object is positioned midway between the angular separation of the two beams, the two return signals have equal magnitude as shown in FIG. 1(a), otherwise, they do not, as shown in FIG. 1(b). The direction of the beam may be adjusted to maintain the two return signals equal in magnitude and thereby track the object.

FIG. 1(c) shows the phenomenon of multi-path signal propagation in return radar signals. A direct return path (D) conveys reflected signals directly to the radar antenna without intermediate reflections which would change the received direction of the return signal at the antenna. However, a reflected, indirect path (R) also exists in which returned signals undergo an intermediate reflection from the ground surface (9). The path length of the indirect path exceeds that of the direct path and the return signal via the indirect path is received after receiving the return signal from the direct path, when both originate from the same outgoing pulse, as shown in FIG. 1(c).

This temporal separation is an indication in a return signal pattern that multipath propagation exists. However, this is not unambiguous since the additional, subsequent return signal (R) could be interpreted as showing the presence of a second object (not shown) located at a greater range than the first object (6).

To solve this ambiguity, one may attempt to detect the angle of altitude at which the subsequent return signal was received. This requires the two radar beams (3, 4) to be able to resolve this angle as compared to the angle of detection determined for the direct path (D). When an object (6) being tracked is close to horizon, the difference in the angle at which the direct and indirect return signals are received can be vary small and may be impossible to resolve with the usual two-beam method illustrated in FIG. 1. Thus, it may not be possible to distinguish between the direct return signal and the indirect one unambiguously.

Figure 2:
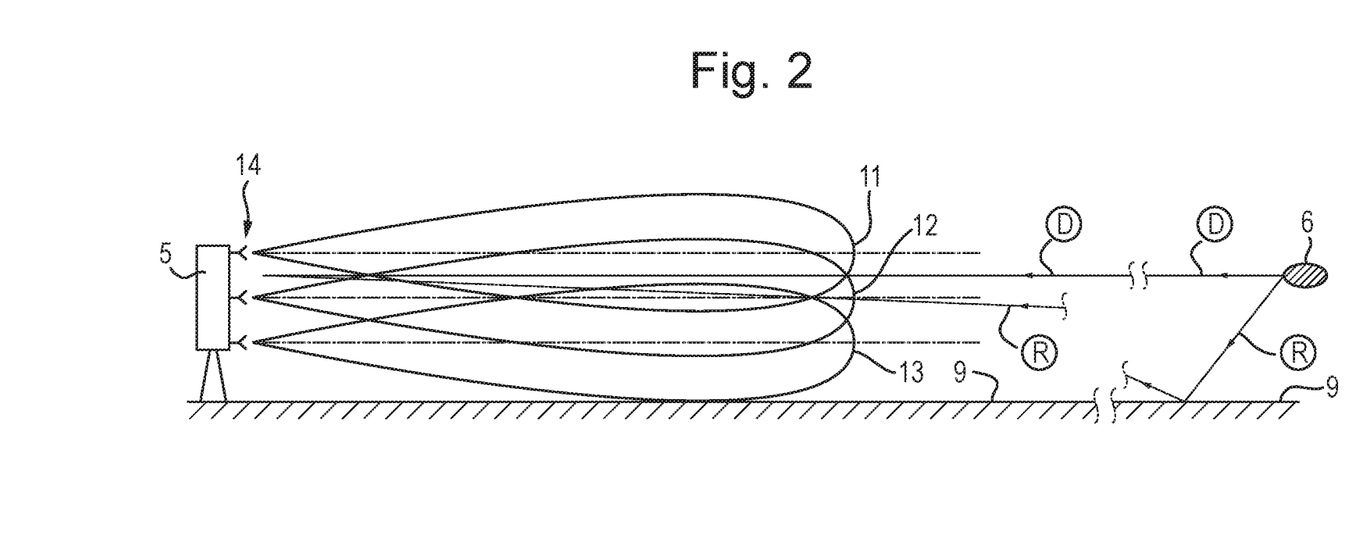
FIG. 2 graphically illustrates a radar apparatus according to a preferred embodiment of the invention, detecting multipath signal propagation.

FIG. 2 shows an embodiment of the invention comprising radar unit (5) for detecting multipath signal propagation (R) when determining an elevation angle of an object (6) close to the horizon. The radar apparatus includes three separately driven antennas (14) arranged in a vertical array, equally spaced neighbour-to-neighbour. The radar unit is arranged to drive the uppermost and middle antennas to transmit radio pulses within a first antenna beam (11) and within a separate second antenna beam (12), respectively. The middle beam (12) is directed at an elevation angle which is less than that of the first antenna beam (11), however, the second antenna beam (12) partially overlaps the first antenna beam (11).

The radar unit is arranged to receive simultaneously the reflections of signals transmitted from the upper and middle antennas, as return radio signals within the first and second antenna beams (11, 12) when reflected from the object (6).

The radar unit also includes a third and lowermost antenna of the array of three antennas (14) which is also arranged to receive return radio signals. This third defines a third antenna beam (13) directed at an elevation angle which is less than that of the first and second antenna beams. The elevation angle of each of the first and second antenna beams (11, 12) is such that each of the first and second antenna beams is directed above horizontal, and the elevation angle of the third antenna beam is such that the third antenna beam (13) is directed below horizontal.

The radar apparatus is arranged to determine an elevation of the object (6) collectively using return radio signals (D) received within all of the first, second and third antenna beams (11, 12, 13) and to detect multipath signal propagation using a return radio signal (R) received within all three antenna beams. In particular, the radar unit is arranged to detect multipath signal propagation if sufficient return radio signal is received within the third antenna beam, which is thereby determined to have been received from a direction below horizontal.

The array of three antennas (14) forming the sensor array shown in FIG. 2 is a schematic which is simplified to aid clarity. It should be understood that there may be many more than three antennas forming a larger array provided that two or more form respective above-horizontal beams and one or more antennas define respective below-horizontal beam(s).

Consider the array of antennas operating in receive mode as three separate sensors in a sensor array. For such a sensor array, the measured return signal data can be represented as a return signal vector:

$$g(t) = \begin{bmatrix} g_1(t) \\ g_2(t) \\ g_3(t) \end{bmatrix}.$$

Here, the variable t represents time and $g_i$ (i=1, 2, 3) represents the return signal data in the $i^{th}$ antenna element/sensor. The return signal data represents the amplitudes and phases of radio signals received at the antenna elements of the array (14), together with some noise. Where there are more than three antenna sensor elements (e.g. M antenna elements) there would be more than three components g in the return data signal vector (e.g. M components, one for each sensor). The cross-correlation matrix, or covariance matrix of this return signal vector is given by:

$$H(t) = [g, g^T] = \begin{bmatrix} |g_1(t)|^2 & g_1^*(t)g_2(t) & g_1^*(t)g_3(t) \\ g_2^*(t)g_1(t) & |g_2(t)|^2 & g_2^*(t)g_3(t) \\ g_3^*(t)g_1(t) & g_3^*(t)g_2(t) & |g_3(t)|^2 \end{bmatrix}$$

where T represents the conjugate transpose. This matrix is a 3×3 matrix in the present example, but would be an M×M matrix were there M antenna elements/sensors in the antenna array. The eigenvectors, $V_j(t)$, of H(t) and their associated eigenvalues $\lambda_j$ (j=1, 2, 3) are defined by:

$$H(t)V_j(t) = \lambda_j V_j(t),$$

such that, $$\{H(t) - \lambda_j I\} V_j(t) = 0,$$

where I is the identity matrix. This eigenvalue decomposition of the cross-correlation matrix defines an orthogonal set of coordinates, or basis vectors (the eigenvectors), in which the variance of the return signal data is highest on an axis defined by one basis vector and lowest on an orthogonal axis defined by another basis vector. These axes are known as the principal components of the data set. It can be seen that:

$$V_j^T(t)H(t)V_j(t)=\lambda_j$$

This means that the variance of the of the projected data on a given eigenvector is equal to its eigenvalue. These eigenvalues can be considered as a measure of energy or power and the total energy in the sensor system is the sum of all M eigenvalues:

$$\sum_{j=1}^{M} \lambda_j = \text{Total\_Energy}$$

In the example of FIG. 2, M=3. The component of the total energy which is projected onto any given eigenvector corresponds to the eigenvalue for that eigenvector. The eigenvalue/eigenvector pair ($V_1$, $\lambda_1$) is associated with the return signal data $g_1$ from a first antenna element of the antenna array which is uppermost in the array and has the highest elevation above the horizontal of the three, The eigenvalue/eigenvector pair ($V_2$, $\lambda_2$) is associated with the return signal data $g_2$ for a second antenna element of the antenna array which is immediately below the first antenna element and has a lesser elevation angle above the horizontal. The eigenvalue/eigen vector pair ($V_3$, $\lambda_3$) is associated with the return signal data $g_3$ from a third, lowermost antenna element of the antenna array which has an elevation angle below horizontal. Note, however, that each of these three eigenvalue/eigenvector pairs is calculated using return signal data of the whole array. The association of a given eigenvalue/eigen vector pair with a certain antenna element is made possible by the fact that the an eigenvalue associated with a given return signal, for a given antenna element, appears in the same row in the matrix;

$$\{H(t)-\lambda_j I\}$$

as the row (j) of the return signal vector g(t) in which the return signal data $g_i(t)$ appears. The antenna system is arranged to calculate the eigenvalues and eigenvectors of the cross-correlation/covariance matrix formed from the return data for all elements in the antenna array (three in this example, but typically more than that) and to identify the eigenvalue $\lambda_3$ associated with the third antenna element with below-horizontal elevation. The magnitude of this third eigenvalue $\lambda_3$ is then compared to a threshold value ($\lambda_{TH}$) which is chosen to be representative of the maximum magnitude of signal noise expected within the antenna system. If the magnitude of this third eigenvalue $\lambda_3$ is not greater than the threshold value, it is deemed to be associated with system noise and that multipath signal propagation is not present. However, if the magnitude of the third eigenvalue exceeds the threshold value (i.e. $\lambda_3 > \lambda_{TH}$) then it is concluded that the third antenna element has received a return signal caused my multipath signal propagation.

The third eigenvalue is thereby used as a measure of the magnitude of the return signal received at the third antenna element, and the threshold is used to determine whether the return signal is sufficiently significant to be considered as being due to multipath signal propagation rather than just noise. The threshold value may be chosen as appropriate for a given antenna system and operating mode thereof, but purely as an example, the threshold value may be a value which corresponds to return signals no higher than −10 dB, Other threshold values can be used as appropriate or desired.

This is described with reference to FIGS. 3 to 5 below.

Figure 3:
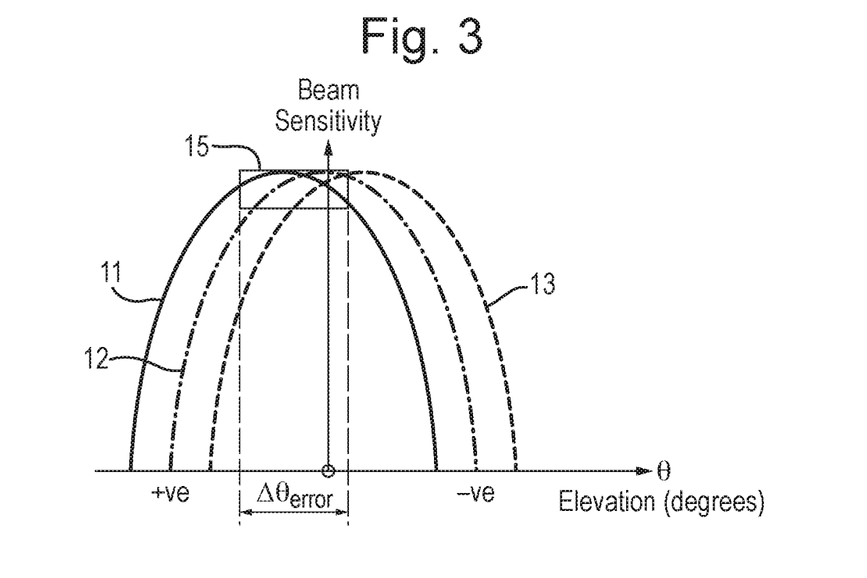
FIG. 3 graphically illustrates a plot of angular sensitivities of three antenna beams in rectangular coordinates.

FIG. 3 graphically illustrates a plot of angular sensitivities of three antenna beams in rectangular coordinates. FIG. 4 graphically illustrates a magnified view of a region of the graph of FIG. 3. Referring to FIG. 3, the angular separation of the centres of the first and second radar beams (11, 12) is very small. The peak sensitivity of the first beam occurs at an angular direction very close to that at which the peak in sensitivity of the second beam occurs. This close positioning of the beams in elevation angle is desirable to allow accuracy in determining the elevation of a distant object (6). However, fluctuations in the sensitivity of each beam, such as will occur due to noise in the receiver circuitry of the radar unit and in ambient signal levels, places limitations on the accuracy with which a return signal level can be reliably determined. The rectangular "error margin" box (15) of FIG. 3 represents this limitation graphically upon the antenna beam sensitivities. The vertical extent of the rectangular error margin box represents the variance or error in sensitivity of the first and second beams, and the horizontal extent of the error margin box represents the corresponding uncertainly in angular position ($\Delta\theta_{error}$) that is determinable using the two radar beams in the manner described above regarding mono-pulse detection. This represents an angular resolution limitation. It is to be noted that the dimensions of the error margin box (15) are greatly exaggerated for better illustration of the principles involved.

Figure 4:
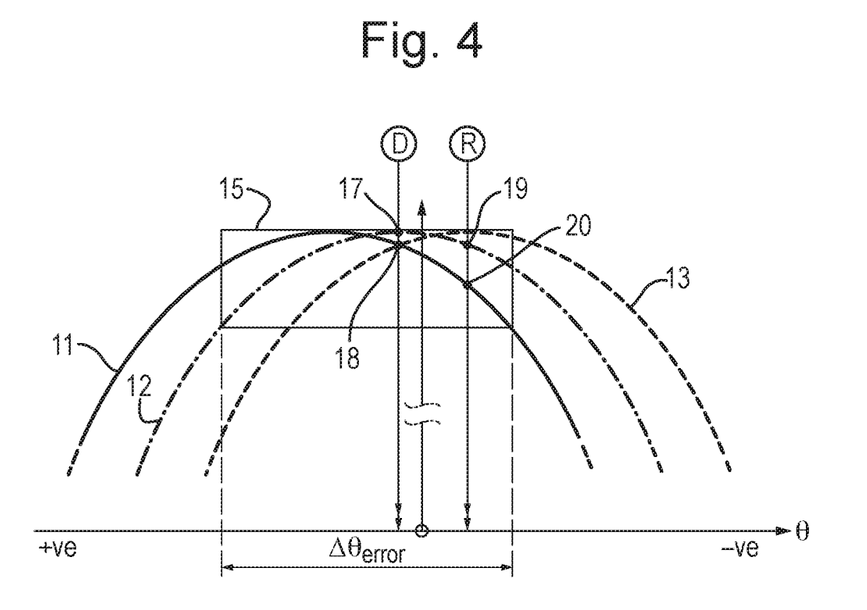
FIG. 4 graphically illustrates a magnified view of a region of the graph of FIG. 3.

FIG. 4 shows a magnified view of the error margin box (15) and the peak regions of the first, second and third radar beams (11, 12, 13). A direct return signal (D) is shown as received by both the first and second radar beams at a positive elevation angle. The angle corresponds to the peak sensitivity of the second beam (17). A return signal in the second radar beam (17) exceeds that in the first radar beam (18). Were this resolvable using only the first and second beams, the radar unit would determine that the object was at an elevation corresponding to the elevation of the second beam. However, as both return signals fall within the error margin box, this resolution is not possible and the result would be that the elevation of the object could be said to be somewhere within $\Delta\theta_{error}$. The same result hold true in respect of the indirect return signal (R) received within the first and second beams and resulting in respective return signals (19, 20) which also fall within the error margin box. Thus, the direct and indirect signals could not be resolved.

However, by providing a third radar beam directed at an elevation below horizontal, the radar unit is able to generate a return signal (16) in respect of the indirect return signal. The radar apparatus employs this return signal within the third radar beam to determine the presence of multipath signal propagation (i.e. identify signals from the indirect path (R)) using the eigenvalue method described above.

Figure 5:
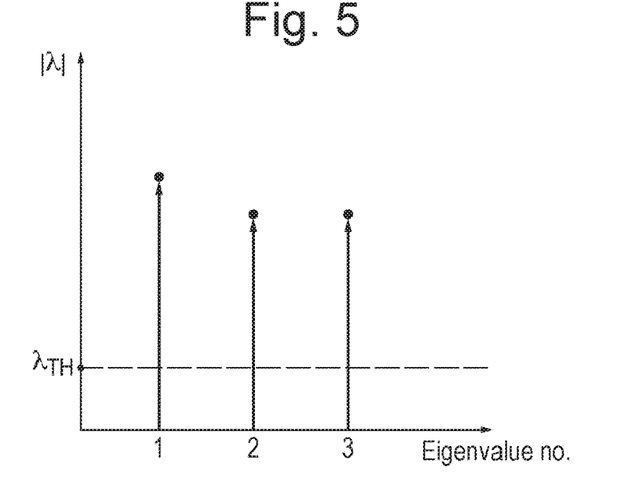
FIG. 5 schematically illustrates the magnitudes of eigenvalues of the cross-correlation matrix of return signal data for the radar apparatus of FIG. 2.

FIG. 5 graphically illustrates the three eigenvalues ($\lambda_1$, $\lambda_2$, $\lambda_3$) associated with the return radar signals received within the first, second and third radar beams (11, 12, 13) respectively, of FIG. 3. A threshold value $\lambda_{TH}$ is also shown. The radar unit is arranged to detect that multipath signal propagation is present if the third eigenvalue associated with a return radio signal in the third antenna abeam (13) exceeds the threshold value $\lambda_{TH}$.

Subsequent steps may then be taken to mitigate the undesirable effects of multipath signal propagation. For example, the third eigenvector associated with this third eigenvalue may be deleted, removed or otherwise not used in subsequent determination of the elevation of the target (6), for which the eigenspace defined by the remaining eigenvectors is used. In this way, the effects of multipath signal propagation may be removed from the return signal data set for the whole array, thereby improving the accuracy of that data set.

Alternatively, or in addition, a null may be formed and located at the angular position at which the indirect return signal (R) is received by the antenna array. An example of how this may be achieved is given below. Consider an antenna with M channels (antenna elements, e.g. M=3). Then, the complex gain patterns of the channels in a direction θ are given by:

$$g(\theta) = \begin{bmatrix} g_1(\theta) \\ g_2(\theta) \\ \vdots \\ g_M(\theta) \end{bmatrix} = \gamma(\theta)\hat{g}(\theta)$$

The factor $\gamma(\theta)$ is used to allow the use of the normalised vector $\hat{g}(\theta)$, wherein:

$$\hat{g}(\theta)^H \hat{g}(\theta) = 1$$

To form a beam in the direction α, the channel outputs are combined using a set of weightings a given by:

$$a = \hat{g}(\alpha)$$

So that the antenna pattern is then $y_{60}(\theta)$:

$$y_\alpha(\theta) = \hat{g}(\alpha)^H \hat{g}(\theta)$$

i.e. the value of $y_\alpha(\theta)$ in the direction α is unity, and the value in any other direction cannot exceed unity.

To form a null in the direction β, corresponding to the direction of the return signal (such as signal R detected in the third antenna beam β) associated with multi-path signal propagation, the channel outputs are combined using a set of normalised weightings given by:

$$a \propto \sqrt{\frac{1}{b^H Q_\beta b}} \times Q_\beta b^*$$

where $Q_\beta$ is defined by:

$$Q_\beta = I_M - \hat{g}(\beta)\hat{g}(\beta)^H$$

and:

$$Q_\beta Q_\beta = Q_\beta$$

The coefficients in the vector b can be chosen as desired. The antenna pattern is then $y_\beta(\beta)$:

$$y_\beta(\theta) = \sqrt{\frac{1}{b^H Q_\beta b}} \times b^H Q_\beta \hat{g}(\theta)$$

Note that only the component of b which is orthogonal to $\hat{g}(\beta)$ contributes to $y_\beta(\theta)$. In this way, a null may be placed at the angular location of the multipath propagation return signal to mitigate against the effects of that return signal.

Figure 6:
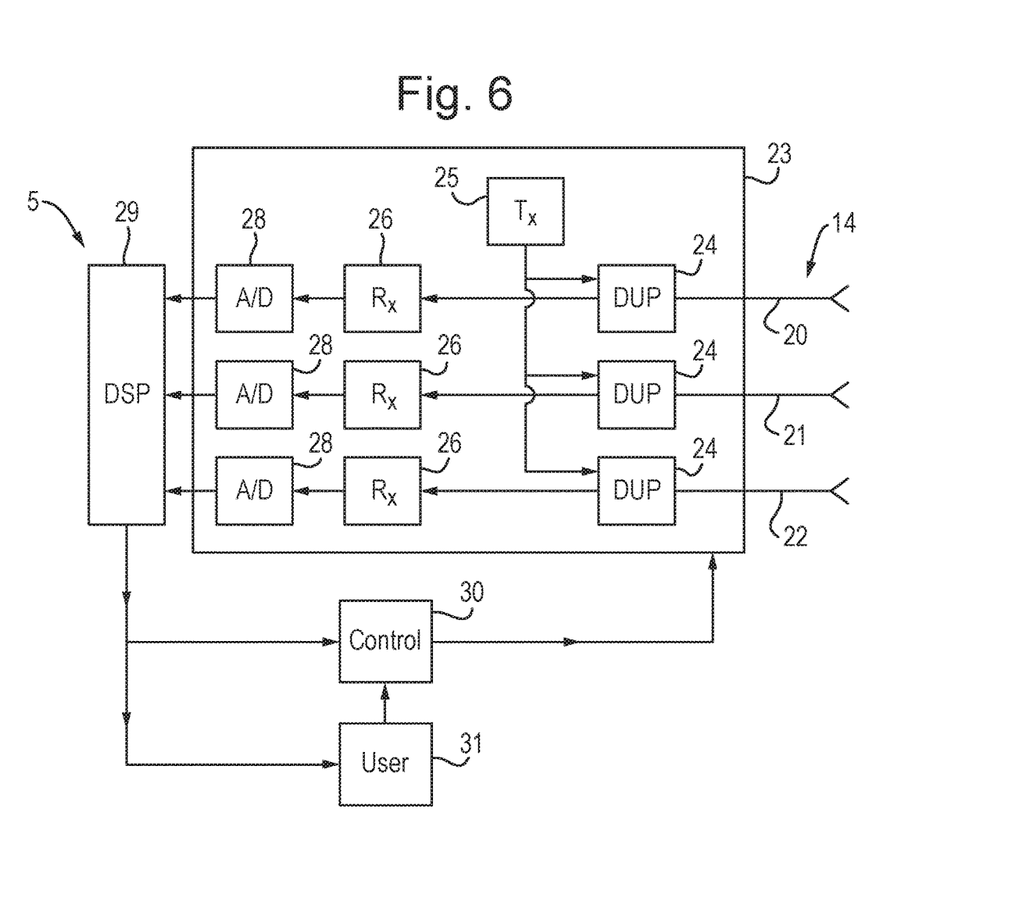
FIG. 6 schematically illustrates a radar apparatus of FIG. 2 in detail.

FIG. 6 schematically illustrates a radar apparatus (5) of FIG. 2 in detail.

An uppermost first antenna element (20), a middle second (21) antenna element, and lowermost third (22) antenna element of the vertical array (14) are connected in common to an antenna housing (23), which may be steerable. It is to be noted that a system comprising only three antenna elements is shown here for illustrative purposes, and it may be desirable to use more antenna elements located above the first antenna element (20) which may each be set at successively increasing elevation angles. Each of the first, second and third antenna elements is connected to a respective signal duplexer (24) which has is arranged to receive transmission signals from a transmitter unit (25) which serves each of the antenna elements in common, and to pass the transmissions to the antenna elements for transmission. Each duplexer also is arranged to pass received return signals to a respective receiver unit (26) and thence to a respective analogue-to-digital converter unit (28) for converting the received return signals into digital form.

All three digital-to-analogue converter units (28) are connected to a digital signal processor arranged to process the return signals in order to determine an elevation angle of the object being tracked and to detect multi-path propagation signals in the manner described above. The detail of the digital signal processing may be such as would be readily apparent to the skilled person.

The output of the digital signal processor is connected to an antenna control unit (30) and to a user station (31), and includes data indicating the detected elevation angle of the object being tracked. The data may also include information identifying which of the return signal data is the result of multi-path propagation signals such that this may be identified by a user station (31). The user station may identify the multi-path propagation signals to a user as such, or may discard them, or otherwise suitably process them for use as desired.

It is to be understood that the embodiments described above are intended for illustration to aid understanding of the invention and that modifications, variants or equivalents of elements of the embodiments, such as would be readily apparent to the skilled person, are encompassed within the scope of the invention, e.g. such as is defined by the claims.

The invention claimed is:

1. A radar apparatus for detecting multipath signal propagation when determining an elevation angle of an object, comprising:
    an antenna array including
        a first antenna unit configured to transmit a first radar pulse at an angle of elevation above horizontal,
        a separate second antenna unit configured to transmit a second radar pulse at an angle of elevation above horizontal, the angle of elevation of the second radar pulse is less than that of the first radar pulse, and
        a separate third antenna unit configured to transmit a third radar pulse at an angle of elevation below horizontal;
        wherein the antenna array is configured to receive return radio signals via the first, second, and third antenna units; and
    one or more processors to calculate a measure of the magnitude of a return radio signal received via the third antenna unit based on all of the received radio signals collectively, and to detect multipath signal propagation using said measure.

2. The radar apparatus according to claim 1, wherein the measure is a magnitude of an eigenvalue of a cross-correlation matrix of the return radio signals received via the first, second and third antenna units.

3. The radar apparatus according to claim 2, further configured to determine an elevation of the object above a ground surface using eigenvectors of the cross-correlation matrix other than an eigenvector thereof associated with the eigenvalue if the magnitude of the eigenvalue exceeds a threshold value, the threshold value independent of and different from eigenvalues of the cross-correlation matrix.

4. The radar apparatus according to claim 2, further configured to beam-form one or more of the radar pulses to locate a null in a beam pattern of the antenna array at the angular elevation location associated with the detected multi-path signal propagation if the magnitude of the eigenvalue exceeds a threshold value.

5. The radar apparatus according to claim 1, further configured such that an angular separation in elevation between the first and second radar pulses is substantially the same as an angular separation in elevation between the second and third radar pulses.

6. The radar apparatus according to claim 1, wherein the first antenna unit is configured to transmit independently the first radar pulse, wherein the second antenna unit is configured to transmit independently the second radar pulse, and wherein the third antenna unit is configured to transmit independently the third radar pulse.

7. The radar apparatus according to claim 1, wherein the antenna array comprises a phased array of antennas that includes the first antenna unit, the second antenna unit, and the third antenna unit.

8. A mono-pulse radar apparatus comprising the radar apparatus of claim 1.

9. A method for detecting multipath signal propagation when determining an elevation angle of an object using radar, the method comprising:
transmitting, with an antenna array, at least three separate radar pulses including a first radar pulse transmitted via a first antenna unit at an angle of elevation above horizontal, a separate second radar pulse transmitted via a second antenna unit at an angle of elevation above horizontal, and a separate third radar pulse transmitted via a third antenna unit at an angle of elevation below horizontal, wherein the angle of elevation of the second radar pulse is less than that of the first radar pulse;
receiving return radio signals via the first, second and third antenna units;
calculating a measure of the magnitude of a return radio signal received via the third antenna unit based on all of the received radio signals collectively;
comparing the measure of the magnitude with a pre-selected threshold value that is selected prior to transmission of the first, second, and third radar pulses; and
detecting multipath signal propagation, based on the comparison.

10. The method according to claim 9, wherein said measure is a magnitude of an eigenvalue of a cross-correlation matrix of the return radio signals received via the first, second and third antenna units.

11. The method according to claim 10, further comprising determining an elevation of the object above a ground surface using eigenvectors of the cross-correlation matrix other than an eigenvector thereof associated with the eigenvalue if the magnitude of the eigenvalue exceeds a threshold value.

12. The radar apparatus according to claim 1, wherein the one or more processors are to detect multipath signal propagation, in response to said measure being higher than a pre-configured threshold value, the pre-configured threshold value selected prior to transmission of the first, second, and third radar pulses.

13. The radar apparatus according to claim 1, wherein the one or more processors are to detect multipath signal propagation, in response to said measure being higher than a threshold value, the threshold value being different from eigenvalues of a cross-correlation matrix of the return radio signals received via the first, second and third antenna units.

14. The radar apparatus according to claim 1, wherein the one or more processors are to compare said measure with a pre-configured threshold value, the pre-configured threshold value selected prior to transmission of the first, second, and third radar pulses.

15. The radar apparatus according to claim 1, wherein the one or more processors are to compare one or more eigenvalues of a cross-correlation matrix of the return radio signals received via the first, second and third antenna units with a pre-selected threshold value, the pre-selected threshold value selected prior to transmission of the first, second, and third radar pulses.

16. The radar apparatus according to claim 1, wherein the one or more processors are to compare one or more eigenvalues of a cross-correlation matrix of the return radio signals received via the first, second and third antenna units with a threshold value, the threshold value representative of a magnitude of signal noise expected within the antenna array.

17. The radar apparatus according to claim 16, wherein the threshold value is representative of a maximum magnitude of signal noise expected within the antenna array.

18. A radar apparatus comprising:
an antenna array including
a first antenna unit configured to transmit a first radar pulse at a first angle of elevation,
a second antenna unit configured to transmit a second radar pulse at a second angle of elevation, and
a third antenna unit configured to transmit a third radar pulse at a third angle of elevation below horizontal, wherein at least one of the first, second or third angles is above horizontal, and wherein at least another one of the first, second or third angles is below horizontal; and
one or more processors to:
calculate a measure of the magnitude of a return radio signal received via the third antenna unit, based on all of the received radio signals collectively,
compare the measure of the magnitude of the return radio signal received via the third antenna unit with a pre-selected threshold value, the pre-selected threshold value selected prior to transmission of the first, second, and third radar pulses, and
detect multipath signal propagation, based on the comparison.

19. The radar apparatus of claim 18, wherein the measure of the magnitude of the return radio signal received via the third antenna unit is a magnitude of an eigenvalue of a cross-correlation matrix of the return radio signals received via the first, second and third antenna units.

20. The radar apparatus of claim 18, wherein the pre-selected threshold value representative of a magnitude of signal noise expected within the antenna array.

* * * * *